(12) United States Patent
Baeuerle et al.

(10) Patent No.: US 10,450,948 B2
(45) Date of Patent: Oct. 22, 2019

(54) CHARGER, IN PARTICULAR AN EXHAUST GAS TURBO CHARGER, FOR A DRIVE DEVICE AND CORRESPONDING DRIVE DEVICE

(71) Applicant: Robert Bosch GmbH, Stuttgart (DE)

(72) Inventors: Michael Baeuerle, Eberdingen (DE); Michael Nau, Dornhan/Aischfeld (DE)

(73) Assignee: Robert Bosch GmbH, Stuttgart (DE)

( * ) Notice: Subject to any disclaimer, the term of this patent is extended or adjusted under 35 U.S.C. 154(b) by 96 days.

(21) Appl. No.: 15/550,893

(22) PCT Filed: Jan. 19, 2016

(86) PCT No.: PCT/EP2016/051005
§ 371 (c)(1),
(2) Date: Aug. 14, 2017

(87) PCT Pub. No.: WO2016/134886
PCT Pub. Date: Sep. 1, 2016

(65) Prior Publication Data
US 2018/0045108 A1 Feb. 15, 2018

(30) Foreign Application Priority Data
Feb. 27, 2015 (DE) .......................... 10 2015 203 596

(51) Int. Cl.
  F02B 39/10 (2006.01)
  F02B 37/10 (2006.01)
  (Continued)

(52) U.S. Cl.
  CPC .............. F02B 39/10 (2013.01); F02B 37/10 (2013.01); F02B 39/005 (2013.01);
  (Continued)

(58) Field of Classification Search
  CPC .............................. F02B 39/10; F02B 39/005
  See application file for complete search history.

(56) References Cited

U.S. PATENT DOCUMENTS 5,474,429 A * 12/1995 Heidelberg ........... F04D 25/066
                                                                    310/63
5,870,894 A *  2/1999 Woollenweber ...... F02B 37/005
                                                                    417/407
(Continued)

FOREIGN PATENT DOCUMENTS

CN        101688470 A    3/2010
EP         1995426 A1   11/2008
(Continued)

OTHER PUBLICATIONS

International Search Report dated Apr. 21, 2016, of the corresponding International Application PCT/EP2016/051005 filed Jan. 19, 2016.
(Continued)

Primary Examiner — Jason D Shanske
Assistant Examiner — Jessica L Kebea
(74) Attorney, Agent, or Firm — Norton Rose Fulbright US LLP; Gerard Messina

(57) ABSTRACT

An exhaust gas turbocharger for a drive device, having a compressor that is capable of being electrically supported or driven by a media gap motor, the media gap motor having a rotor that is operatively connected to a bearing shaft of a compressor impeller of the compressor, and having a stator that surrounds the rotor at least in some regions in the circumferential direction relative to an axis of rotation of the bearing shaft. A power electronics for controlling at least one electrical winding of the stator surrounds the axis of rotation at least in some regions in the circumferential direction, a cooling jacket that stands in touch contact with the stator
(Continued)

and/or with the power electronics being provided for cooling the stator and/or the power electronics.

7 Claims, 1 Drawing Sheet

(51) Int. Cl.
    *F02B 39/00*     (2006.01)
    *F04D 25/06*     (2006.01)
    *F04D 29/42*     (2006.01)
    *F04D 29/58*     (2006.01)
    *H02K 9/19*     (2006.01)
    *H02K 9/22*     (2006.01)
    *H02K 11/33*     (2016.01)
    *H02K 7/14*     (2006.01)
    *H02K 7/18*     (2006.01)

(52) U.S. Cl.
    CPC ....... *F04D 25/0606* (2013.01); *F04D 25/066* (2013.01); *F04D 25/068* (2013.01); *F04D 29/4213* (2013.01); *F04D 29/5806* (2013.01); *F04D 29/5813* (2013.01); *H02K 9/19* (2013.01); *H02K 9/22* (2013.01); *F05D 2220/40* (2013.01); *H02K 7/14* (2013.01); *H02K 7/1823* (2013.01); *H02K 11/33* (2016.01); *Y02T 10/144* (2013.01)

(56) References Cited

U.S. PATENT DOCUMENTS

| | | | | |
|---|---|---|---|---|
| 5,904,471 A | * | 5/1999 | Woollenweber | F02B 37/16 417/307 |
| 6,129,524 A | * | 10/2000 | Woollenweber | F04D 17/12 417/366 |
| 6,145,314 A | * | 11/2000 | Woollenweber | F01D 15/10 310/156.21 |
| 2006/0081226 A1 | * | 4/2006 | Bolz | F02B 33/40 123/565 |
| 2009/0174267 A1 | * | 7/2009 | Bischof | F04D 25/0606 310/52 |
| 2015/0337850 A1 | * | 11/2015 | An | F02B 39/00 60/605.3 |
| 2016/0123336 A1 | * | 5/2016 | Spinner | F02B 33/40 417/53 |
| 2016/0164362 A1 | * | 6/2016 | Lehner | F04B 35/04 310/208 |
| 2016/0241110 A1 | * | 8/2016 | Maguire | H02K 9/04 |
| 2017/0328269 A1 | * | 11/2017 | Yamashita | F01P 3/20 |
| 2017/0335756 A1 | * | 11/2017 | Donkin | F02B 37/10 |
| 2018/0023593 A1 | * | 1/2018 | Fujiki | F02B 37/10 310/68 D |

FOREIGN PATENT DOCUMENTS

| | | | | |
|---|---|---|---|---|
| EP | 2072824 A2 | 6/2009 | | |
| EP | 2305981 A1 | 4/2011 | | |
| WO | WO-2009087273 A2 | * 7/2009 | ............. | F02B 33/34 |
| WO | 20140210093 A1 | 12/2014 | | |
| WO | WO-2015188028 A2 | * 12/2015 | ............. | F02B 39/10 |

OTHER PUBLICATIONS

"Hybridturbolader mit neuer Elektromotorentechnik" [Hybrid turbocharger having new electric motor technology], MTZ, Mar. 2014, pp. 50-55.

* cited by examiner

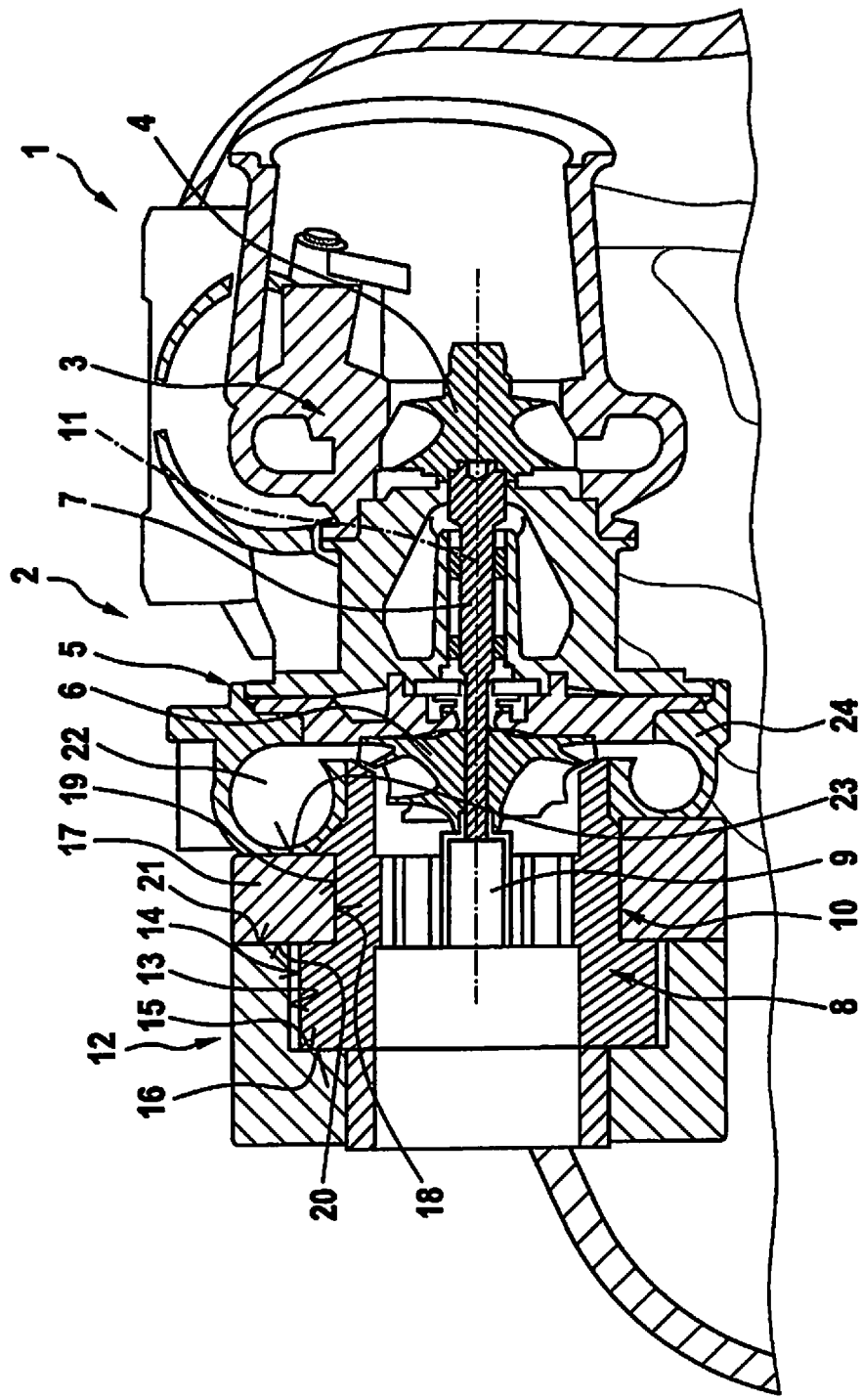

CHARGER, IN PARTICULAR AN EXHAUST GAS TURBO CHARGER, FOR A DRIVE DEVICE AND CORRESPONDING DRIVE DEVICE

BACKGROUND INFORMATION

The present invention relates to a charger, in particular an exhaust gas turbocharger, for a drive device, having a compressor that is capable of being electrically supported or driven by a media gap motor, the media gap motor having a rotor that is operatively connected to a bearing shaft of a compressor impeller of the compressor, as well as a stator that surrounds the rotor at least in some regions in the circumferential direction, relative to an axis of rotation of the bearing shaft. In addition, the present invention relates to a drive device.

The charger can be a component of the drive device. The drive device is for example allocated to a motor vehicle, and is used to drive the motor vehicle. The drive device has for example a drive aggregate, in particular an internal combustion engine. In addition, the charger is allocated to the drive device. Using the charger, air is compressed, in particular fresh air that is supplied to the drive device, and in this way the air is brought from a lower, first pressure level to a higher, second pressure level. After the compression of the air by the charger, or with the aid of the compressor of the charger, the air is supplied to the drive aggregate. In this way, the efficiency and/or performance of the drive aggregate can be improved.

If the charger is fashioned as an exhaust gas turbocharger, then in addition to the compressor it has a turbine over, or through, which exhaust gas flows during operation of the drive device. The exhaust gas is for example produced by the drive aggregate, thus in particular by the internal combustion engine. When flowing through the turbine, enthalpy and/or flow energy is taken from the exhaust gas and is converted into kinetic energy that is then used to drive the compressor. Correspondingly, the charger, and in particular the pressure ratio that can be reached using the charger, i.e. the ratio between the second pressure level and the first pressure level, is to a large extent a function of an operating point of the drive device.

For this reason, the media gap motor is allocated to the charger. With the aid of this motor, the compressor can be electrically supported. The compressor can also be driven solely by the media gap motor. For this purpose, the media gap motor is operatively connected to the bearing shaft of the compressor impeller of the compressor, so that, using the media gap motor, a torque can be applied to the bearing shaft and thus to the compressor impeller, which is rigidly and/or permanently operatively connected to the bearing shaft. In addition to the rotor, the media gap motor has the stator, which surrounds the rotor at least in some regions, in particular in the circumferential direction relative to the axis of rotation of the bearing shaft, or of the compressor impeller.

The media gap motor is distinguished in that it has a very large air gap between the stator and the rotor. For example, an outer diameter of the rotor is at most 50% relative to an inner diameter of the stator. The region between the outer circumference of the rotor and the inner circumference of the stator is designated the air gap. Due to the very large air gap, compared to conventional electric motors, comparatively large stator coils having high inductance are required. This inductance causes high apparent currents that can cause electrical losses both in the coils and in a power electronics of the media gap motor, for example in the form of heat.

The publication "Hybridturbolader mit neuer Elektromotorentechnik [Hybrid turbocharger having new electric motor technology]," MTZ, March 2014, pp. 50-55, describes a hybrid turbocharger.

SUMMARY

An example charger in accordance with the present invention may have the advantage that an improved cooling of the charger is achieved. According to the present invention, this may be achieved in that a power electronics for controlling at least one electrical winding of the stator surrounds the axis of rotation at least in some regions in the circumferential direction, a cooling jacket that stands in touch contact with the stator and/or with the power electronics being provided for the cooling of the stator and/or of the power electronics.

The power electronics is electrically connected to the at least one electrical winding of the stator. It is used to control the winding, preferably a plurality of windings, of the stator in order to provide an electromagnetic rotating field that brings about a rotational movement of the rotor. Ideally, the power electronics is configured in such a way that it surrounds the axis of rotation at least in some regions. Preferably, the power electronics completely surrounds the axis of rotation, i.e., is made continuous in the circumferential direction.

Particularly preferably, the power electronics here surrounds the stator at least partly in the circumferential direction. This means that at least a part of the power electronics is present at the same axial position, or axial positions, as the stator. Preferably, the power electronics is situated further outward in the radial direction than is the stator. In addition or alternatively, at least a region of the power electronics, viewed in the axial direction, can be present alongside the stator, and in particular can be attached to it in the axial direction.

Through such a configuration of the power electronics, as an advantageous side effect an expensive cabling between the power electronics and the stator, or the electrical winding of the stator, can be avoided. Instead, the at least one conductor connecting the power electronics to the at least one winding can be made extremely short. In this way, there results a significantly reduced outlay in order to ensure electromagnetic compatibility. It can be provided that the power electronics lies on the stator at least in some regions, in particular lying continuously on the stator, seen in the circumferential direction.

In addition, the cooling jacket is provided by which the stator and/or the power electronics can be cooled. For this purpose the cooling jacket is connected with a heat-conducting connection to the stator and/or to the power electronics. Particularly preferably, it is in touch contact either with the stator, with the power electronics, or with both, and thus at least in regions lies against these, or on a corresponding housing, in particular an electronics housing of the power electronics. The cooling jacket has at least one flow duct through which a coolant can flow or does flow during operation of the drive device. Particularly preferably, analogous to the power electronics, the cooling jacket surrounds the axis of rotation in the circumferential direction at least in some regions, in particular completely. Here, at least in some regions it can be present at the same axial position, or the same axial positions, as the stator and/or the power electronics. For example, in the radial direction it is situated further out than the stator.

It can be provided that the cooling jacket lies both on the stator and also on the power electronics, or the electronics housing, with touch contact. For this purpose, for example the cooling jacket is in touch contact with its inner circumference with an outer circumference of the stator, while an end face limiting the cooling jacket (seen in the axial direction) lies on the power electronics, in particular an end face of the power electronics, preferably continuously in the circumferential direction in each case. For example, here, seen in the axial direction, the cooling jacket is situated between the power electronics and a compressor outlet of the compressor, so that it lies with the end face on the power electronics and with a further end face, situated opposite the end face in the axial direction, on a compressor housing, in particular the compressor outlet or a compressor outlet housing of the charger.

A preferred embodiment of the present invention provides that the cooling jacket at least partly surrounds the stator in the circumferential direction. Such an embodiment has already been described above. Particularly preferably, the cooling jacket of course surrounds the stator completely in the circumferential direction, lying continuously thereon. Such an embodiment of the cooling jacket makes possible a particularly efficient cooling of the stator using the cooling jacket.

A development of the present invention provides that the inner circumference of the cooling jacket is in touch contact with an outer circumference of the stator. At least in some regions, seen in the radial direction, the cooling jacket is limited inwardly by the inner circumference. At least a region of the inner circumference, but particularly preferably the entire inner circumference, can now lie on the stator. For example, here the inner circumference lies on the outer circumference of the stator, and the outer circumference limits the stator outwardly, seen in the radial direction, at least in some regions. Particularly preferred here is a flat contact between the inner circumference and the outer circumference. For example, a heat-conducting medium, for example a thermally conductive paste or the like, can be introduced between the inner circumference and the outer circumference.

A further embodiment of the present invention provides that an end face that limits the cooling jacket in the axial direction lies on the power electronics, in particular on an end face of the power electronics. The end face limits the cooling jacket at least in some regions, in particular completely, in the axial direction. The end face should here lie on the power electronics at least in some regions. For example, for this purpose it stands in touch contact with the end face of the power electronics, the end face limiting the power electronics in the axial direction at least in some regions, in particular completely. In addition or alternatively, it can be provided that the end face of the cooling jacket and/or a further end face of the cooling jacket lies/lie on the stator, in particular on an end face of the stator. The end face of the stator limits it in the axial direction at least in some regions. Given such an embodiment, it can thus be provided both that the cooling jacket stands in touch contact with its inner circumference on the outer circumference of the stator, and also that its end surface and/or the further end surface lies on the stator. In this way, a particularly efficient cooling of the stator is enabled.

A preferred embodiment of the present invention provides that the cooling jacket, seen in the axial direction, is situated between the power electronics and a compressor housing of the compressor. For example, the cooling jacket is thus present between the end surface of the power electronics and an end surface of the compressor housing. The compressor housing in particular accommodates an impeller of the compressor. While, of course, the cooling jacket can lie on the power electronics and the compressor housing of the compressor, in the axial direction, a configuration can also be provided in which the cooling jacket is at a distance from at least one of these elements, for example both elements. In this way, for example the cooling jacket can lie on the one hand on the power electronics and on the other hand on the compressor housing, or its end face. However, it can also be provided that the cooling jacket does indeed lie on the power electronics but is situated at a distance from the compressor housing in the axial direction. Conversely, it can be provided that the cooling jacket lies on the compressor housing, but in the axial direction is at a distance from the power electronics.

In a further preferred embodiment of the present invention, it is provided that the cooling jacket lies on the compressor housing with a further end face situated opposite the end face. Such an embodiment was already indicated above. For example, here the cooling jacket is situated between the power electronics in the compressor housing, seen in the axial direction, and lies with the further end face on the compressor housing, or on the end face of the compressor housing.

A further embodiment of the present invention provides that at least one electrical conductor of a cabling between the power electronics and an electrical winding of the stator runs in a gap present between the power electronics and the stator, in particular an annular gap. The cabling is used to produce an electrical connection between the power electronics and the electrical winding of the stator. The cabling has the at least one electrical conductor. In order to realize a particularly simple cabling, the electrical conductor runs through the gap that is fashioned between the power electronics and the stator, in particular in the radial direction. The gap can be fashioned as an annular gap, and thus at least in some regions, in particular completely, can be continuous in the circumferential direction. The gap thus surrounds the stator, or the electrical winding, in the circumferential direction at least in regions, in particular completely. At the same time, the power electronics can surround the gap in the circumferential direction at least in some regions, in particular completely. A particularly simple cabling is achieved if the electrical conductor runs essentially in the radial direction through the gap, because in this way it can be made particularly short.

A further advantageous embodiment of the present invention provides that the cooling jacket is additionally provided for the cooling of air exiting from the compressor at a compressor outlet, and/or for the cooling of a compressor housing of the compressor. For example, for this purpose, as already explained above, the cooling jacket lies at least in some regions on a housing of the charger, in particular the compressor housing or the housing of the compressor outlet. The compressor outlet is for example that region of the compressor through which the air compressed by the compressor flows out of the compressor.

Through the cooling of the air, a charge air cooling is realized that further improves the efficiency of the drive device. In addition or alternatively, the cooling of the compressor housing can be provided.

Finally, in a further embodiment of the present invention, it can be provided that the cooling jacket is connected to a liquid coolant circuit in which a charge air cooler of the drive device and/or a bearing cooling and/or a bearing housing cooling are present. The liquid coolant circuit is fashioned for example as a low-temperature circuit. In addition, in the coolant circuit there is provided the charge air cooler by which air is cooled that was previously compressed by the charger, or the compressor. The charge air cooler is thus downstream from the compressor with regard to the air. In particular, it has a flow connection to the compressor outlet and/or the compressor housing. Thus it is particularly advantageous if, in addition to the charge air cooler, the cooling explained above of the air exiting from the compressor is realized by the cooling jacket. In this way, a two-stage and particularly effective charge air cooling is provided. Alternatively, it can be provided that the charge air cooler is integrated in the compressor housing.

In addition or alternatively, it can be provided that a bearing cooling and/or a bearing cooling housing are connected to the coolant circuit. The bearing cooling is used for the cooling of at least one bearing of the drive housing, in particular of the charger. The bearing can be situated in a bearing housing that in turn has the bearing housing cooling. The provision of the bearing cooling and/or of the bearing housing cooling is appropriate in particular if the internal combustion engine is realized as a spark-ignition internal combustion engine.

The present invention also relates to a drive device having a charger, for example an exhaust gas turbocharger, whose compressor is capable of being electrically supported or driven by a media gap motor, the media gap motor having a rotor that is operatively connected to a bearing shaft of a compressor impeller of the compressor, and having a stator that surrounds the rotor in at least some regions in the circumferential direction relative to an axis of rotation of the bearing shaft. Here it is provided that a power electronics for controlling at least one electrical winding of the stator surrounds the axis of rotation at least in some regions in the circumferential direction, a cooling jacket that stands in touch contact with the stator and/or the power electronics being provided for cooling the stator and/or the power electronics.

The advantages of such an embodiment of the drive device, or of the charger, have already been indicated. Both the driver device and the charger can be developed according to the above statements, so that reference is made thereto.

Below, the present invention is explained in more detail on the basis of exemplary embodiments shown in the FIGURE, without limitation of the present invention.

BRIEF DESCRIPTION OF THE DRAWING

The FIGURE shows a longitudinal section of a region of a drive device, in particular of a charger.

DETAILED DESCRIPTION OF EXAMPLE EMBODIMENTS

The FIGURE shows a longitudinal section through a region of the drive device 1, in particular through a charger for drive device 1, realized for example as an exhaust gas turbocharger. Charger 2 preferably has a turbine 3 having a turbine impeller 4, and has a compressor 5 having a compressor impeller 6. Turbine impeller 4 and compressor impeller 6 are operatively connected via a bearing shaft 7, preferably rigidly and/or permanently. This means that a rotational motion of turbine impeller 4 is likewise transmitted to compressor impeller 6.

Charger 2 can be electrically supported or driven by a media gap motor 8, e.g., a gap motor 8 having a rotor 9 and a stator 10. The rotor is operatively connected to compressor impeller 6, preferably via bearing shaft 7. For this purpose, rotor 9 is for example operatively connected rigidly and/or permanently to bearing shaft 7, and in particular is fastened thereto. Stator 10 surrounds rotor 9 in the circumferential direction relative to an axis of rotation 11 of bearing shaft 7 at least in some regions, in particular completely.

It is provided that a power electronics 12 that is used to control media gap motor 8, or at least one electrical winding of stator 10, also surrounds axis of rotation 11 in the circumferential direction at least in some regions, in particular completely. This has the advantage that an expensive cabling between power electronics 12 and stator 10 can be omitted. Power electronics 12 can be configured in such a way that an inner circumference 13 of power electronics 12 lies on an outer circumference 14 of stator 10.

Particularly preferably, however, inner circumference 13 of the power electronics is situated at a distance in the radial direction from outer circumference 14 of stator 10, so that a gap, in particular an annular gap, is formed between them. An electrical conductor of the cabling between power electronics 12 and an electrical winding of stator 10 can run through this gap, in order in this way to realize a particularly short conductor. In addition or alternatively, power electronics 12 can be present at least in some regions alongside stator 10, seen in the axial direction, with respect to axis of rotation 11. In this case, for example an end face 15 of power electronics 12 lies against an end face 16 of stator 10, in particular continuously in the circumferential direction.

In addition, a cooling jacket 17 is provided by which stator 10 and/or power electronics 12 are cooled. Cooling jacket 17 surrounds axis of rotation 11 in the circumferential direction at least in some regions, in particular completely. Here, at least in some regions it is in touch contact with stator 10 and/or power electronics 12, i.e., lies thereon. For example, here it is provided that an inner circumference 18 of cooling jacket 17 lies on an outer circumference 19 of stator 10. In addition or alternatively, an end face 20 of cooling jacket 17 can lie on an end face 21 of stator 10, preferably continuously in the circumferential direction.

In the specific embodiment shown here of drive device 1, cooling jacket 17, seen in the axial direction, is situated between power electronics 12 and a compressor outlet 22. Particularly preferably, here it lies not only with its end face 20 on end face 21 of power electronics 12, but in addition lies with an additional end face 23 on compressor outlet 22, or a compressor outlet housing 24. To this extent, a charge air cooling of the air compressed by compressor 5 can be achieved by cooling jacket 17.

Charger 2 is used to compress air that can subsequently be supplied to a drive aggregate (not shown here) of drive device 1.

The realization described above of drive device 1, or of the explained procedure, may ensure a reliable cooling of stator 10 and/or power electronics 12. Finally, mounting of charger 2 is simplified, and in addition a significantly simpler cabling is realized.

What is claimed is:

1. An exhaust gas turbocharger for a drive device, comprising:
a compressor that is drivable by a gap motor, the gap motor having a rotor that is operatively connected to a bearing shaft of a compressor impeller of the compressor, and having a stator that surrounds the rotor at least in some regions in a circumferential direction relative to an axis of rotation of the bearing shaft;

wherein the gap motor in an axial direction that is parallel to the axis of rotation is situated in an air inlet upstream of the compressor wheel, wherein a power electronics for controlling at least one electrical winding of the stator surrounds the axis of rotation in the at least in some regions in the circumferential direction, a cooling jacket that stands in touch contact with the stator and the power electronics, being provided for cooling the stator and the power electronics by providing a liquid coolant within the cooling jacket, and wherein the cooling jacket in the axial direction is arranged between the power electronics and the compressor housing and wherein an inner circumference of the cooling jacket stands in touch contact with an outer circumference of the stator.

2. The turbocharger as recited in claim 1, wherein the cooling jacket surrounds the stator at least partly in the circumferential direction.

3. The turbocharger as recited in claim 1, wherein an end face that limits the cooling jacket in an axial direction lies on an end face of the power electronics.

4. The turbocharger as recited in claim 1, wherein, seen in the axial direction, the cooling jacket is situated between the power electronics and a compressor housing of the compressor.

5. The turbocharger as recited in claim 3, wherein the cooling jacket lies on the compressor housing with a further end face, situated opposite the end face.

6. The turbocharger as recited in claim 1, wherein the cooling jacket is provided additionally for at least one of: cooling of air exiting from the compressor at a compressor outlet, and cooling a compressor housing of the compressor.

7. A drive device, having comprising:

an exhaust gas turbocharger, the turbocharger including a compressor which is drivable by a gap motor, the gap motor having a rotor that is operatively connected to a bearing shaft of a compressor impeller of the compressor, and having a stator that surrounds the rotor at least in some regions in the circumferential direction relative to an axis of rotation of the bearing shaft;

wherein the gap motor in an axial direction that is parallel to the axis of rotation is situated in an air inlet upstream of the compressor wheel wherein a power electronics for controlling at least one electrical winding of the stator that surrounds the axis of rotation of the rotor in the at least in some regions in the circumferential direction, a cooling jacket that stands in touch contact with the stator and the power electronics being provided for cooling the one of the stator and the power electronics by providing a liquid coolant within the cooling jacket, and and wherein the cooling jacket in the axial direction is arranged between the power electronics and the compressor housing and wherein an inner circumference of the cooling jacket stands in touch contact with an outer circumference of the stator.

* * * * *